May 15, 1951          A. F. GOOD          2,552,549
HYDRAULICALLY CONTROLLED IMPLEMENT WHEEL MOUNT
Filed Sept. 4, 1947
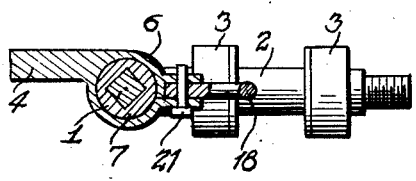
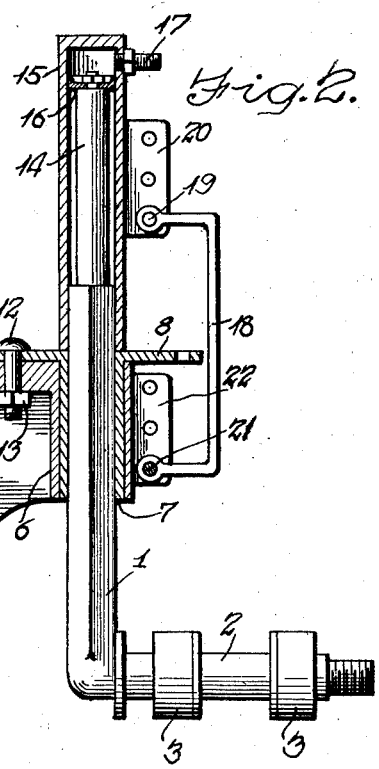
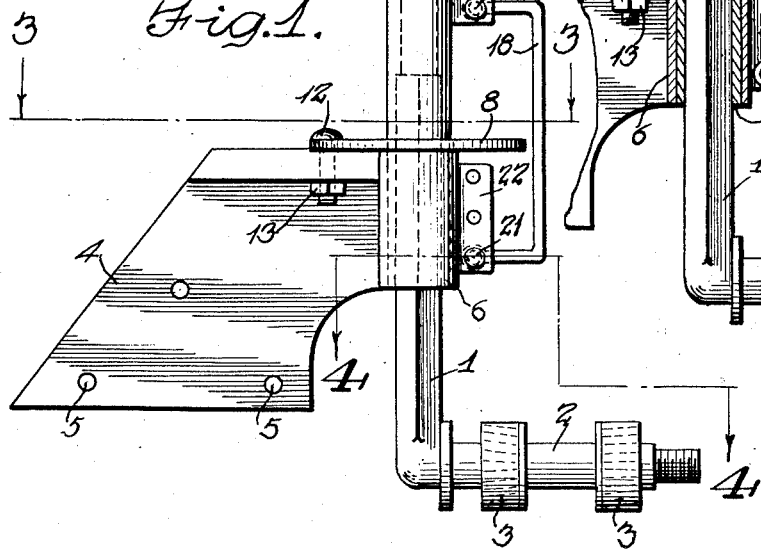
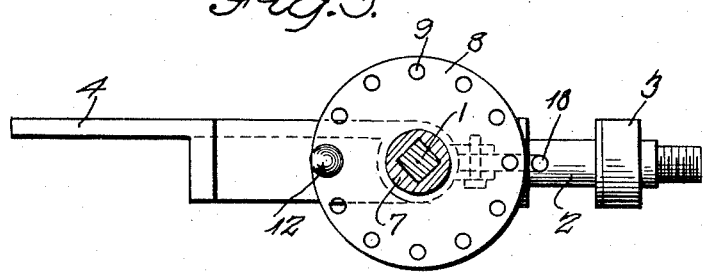
INVENTOR.
Adam F. Good.
BY *Victor J. Evans & Co.*
ATTORNEYS Patented May 15, 1951

2,552,549

UNITED STATES PATENT OFFICE 2,552,549

HYDRAULICALLY CONTROLLED IMPLEMENT WHEEL MOUNT

Adam F. Good, Cherokee, Okla.

Application September 4, 1947, Serial No. 772,159

5 Claims. (Cl. 121—46)

My present invention relates generally to wheeled plows of the vertically adjustable disk type, and more specifically to an improved hydraulically controlled implement wheel mount or vertically adjustable wheel mount, which while especially adapted as an attachment for wheeled plows, is equally well applicable for use with other wheeled implements of the agricultural class, for elevating and adjusting the operating parts to inoperative positions for ease in transporting the implement, and in lowering the operating parts to position for use.

The wheel mount or axle assembly of my invention is herein described and illustrated as a single unit, and it will be understood that the wheeled implement is equipped with a unit for each of its wheels, and means are provided for supplying and controlling fluid pressure, as hydraulic pressure, to each of the units for vertically adjusting the operating parts of the implement.

Each unit includes a minimum number of parts that may with facility be manufactured at low cost of production, and the parts may be assembled with convenience to provide a unitary structure which may easily be installed in connection with the frame of the operating parts and the wheels of the implement.

The invention consists in certain novel features of construction and combinations and arrangements of parts in the wheel mount as will hereinafter be described and more particularly pointed out in the appended claims.

In the accompanying drawings I have illustrated a complete example of a physical embodiment of my invention wherein the parts are combined and arranged in accord with one mode I have devised for the practical application of the principles of my invention. It will however be understood that changes and alterations are contemplated and may be made in these exemplifying drawings and mechanical structures within the scope of my claims without departing from the principles of the invention.

Figure 1 is a view in elevation of an axle assembly in which my invention is embodied.

Figure 2 is a vertical sectional detail view of the structure in Fig. 1.

Figure 3 is a horizontal sectional detail view at line 3—3 of Fig. 1; and

Figure 4 is a horizontal sectional view at line 4—4 of Fig. 1.

In carrying out my invention I employ for use with the wheels of the implement a set of the wheel mounts or unitary attachments, and each wheel mount includes an upright post 1 that is angular or square in cross section and of predetermined height. At its lower end the post is fashioned with a horizontal journal 2, and spaced antifriction bearings, of the roller or ball bearing type, are provided on the journal for the wheel that may be of the caster type.

The angular post is mounted with relation to a vertically adjustable base plate 4 that is to be bolted at 5, 5 to the implement frame upon which the operating parts of the implement are mounted, as for instance a multiple disk plow; and of course the base plate is vertically adjustable with the frame.

The frame plate or base plate is equipped with a bearing sleeve or hub 6 in which a cylindrical bushing 7 is rotatably adjustable, and the bushing is fashioned with an inner angular or square bore complementary to the angular post, to permit vertical adjustment of the bushing on the post.

For retaining the bushing in rotatably adjusted position it is provided with an upper annular flange 8 having a series of bolt holes 9 for selective registration with a single bolt hole 10 in the top flange 11 of the base plate, and a retaining bolt 12 in the registering bolt holes, together with its nut 13, holds the bushing in adjusted position.

By utilization of the adjustable bushing the post of the wheel mount may be turned to bring the journal 2 of the supporting wheel into the proper relation to the wheeled implement, and to locate the journals of several wheels in correct planes.

For use in the hydraulic operations of raising and lowering the implement frame to which the base plate is bolted, the upper end of the post is provided with an extension 14 that projects upwardly into a hydraulic power cylinder 15, and the stem is equipped at its upper end with a piston head 16 located just below the inlet pipe 17 that admits fluid pressure or hydraulic pressure to the cylinder, for elevating the base plate with relation to the post.

The power cylinder is vertically adjustable and connected with the base unit for convenience in installing the wheel mount, and for this purpose a connecting bar 18 is bolted at 19 between a pair of flanges 20 integral with the cylinder, and the lower end of the bar is bolted at 21 between a pair of flanges 22 of the bearing sleeve 6. The flanges have several bolt holes so that the bolts 19 and 21 may be secured in selected holes of the flanges for fixing the cylinder in adjusted position.

As thus described and illustrated it will be apparent that by admitting hydraulic pressure to the cylinder the base plate may be elevated, and by controlling pressure from the cylinder the base plate may be lowered as desired.

Having thus fully described my invention, what I claim as new and desire to secure by Letters Patent is:

1. In a vertically adjustable wheel-mount for the frame of a wheeled implement, the combination with a base plate having an upright bearing sleeve, an inner rotatably adjustable bushing having an angular bore, and means for retaining the bushing in adjusted position, of a wheel-post angular in cross section to correspond with the angular bore of the bushing mounted in the bushing and a stem rigid with the post, a piston head on the stem, a power-cylinder adjustably connected to the base plate enclosing the stem and piston head, and means for introducing hydraulic pressure to the cylinder against the piston head.

2. In a vertically adjustable wheel-mount for the frame of a wheeled implement, the combination with a base plate having an upright bearing sleeve, an inner bushing having an exterior annular flange and an angular bore, and a bolt coacting with the flange and base plate for retaining the bushing in adjusted position, of a wheel-post angular in cross section to correspond with the angular bore of the bushing mounted in the bushing and a stem rigid with the post, a piston head rigid with the stem, a power cylinder adjustably connected to the base plate enclosing the stem and piston head, and means for admitting hydraulic pressure against the piston head.

3. In a vertically adjustable hydraulic wheel-mount, the combination with an upright post, a stem on the post and a piston head on the stem, of a base plate having a bearing for the post, a power cylinder enclosing the stem and piston-head, said cylinder and base plate each having an attaching flange and a series of bolt holes therein, a connecting bar, bolts for adjustably connecting said bar to the flanges, and means for admitting hydraulic pressure to the cylinder against the piston-head.

4. In a vertically adjustable wheel mount for the frame of a wheel implement, the combination which comprises a base plate for attaching the mount to an implement frame, said base plate having a vertically disposed hub at one end, a flanged cylindrical bushing having a longitudinally disposed square bore extended therethrough positioned in the hub of the base plate, a vertically disposed square post positioned in the square bore of the bushing, having a horizontally disposed shaft on the lower end and a piston on the end of an extended stem on the upper end, a hydraulic cylinder adjustably attached to the base plate and aligned with the post and enclosing said piston and an inlet connection in the upper end of the cylinder for admitting fluid under pressure to the cylinder.

5. In a vertically adjustable wheel mount for the frame of a wheel implement, the combination which comprises a base plate for attaching the mount to an implement frame, said base plate having a vertically disposed hub at one end, a flanged cylindrical bushing having a longitudinally disposed square bore extended therethrough positioned in the hub of the base plate, a vertically disposed square post positioned in the square bore of the bushing, having a horizontally disposed shaft on the lower end and a piston on the end of an extended stem on the upper end, a U-shaped connecting bar adjustably connecting the cylindrical bushing to the base plate and a hydraulic connection in the upper end of the cylindrical bushing for admitting fluid under pressure to the cylindrical bushing above the piston.

ADAM F. GOOD.

REFERENCES CITED

The following references are of record in the file of this patent:

UNITED STATES PATENTS

| Number | Name | Date |
|---|---|---|
| 486,095 | Elmes | Nov. 15, 1892 |
| 2,314,041 | Gurries | Mar. 16, 1943 |